TELEVISION SYSTEMS AND OPERATIONS

Filed July 29, 1964 Sheet 1 of 5

Inventor:
Thomas A. Banning, Jr.
Thos. A. Banning Jr.

March 25, 1969 T. A. BANNING, JR 3,435,130

TELEVISION SYSTEMS AND OPERATIONS

Filed July 29, 1964

Inventor:
Thomas A. Banning, Jr.

Inventor:
Thomas A. Banning, Jr.
Tho A. Banning Jr

Inventor:
Thomas A. Banning, Jr.

Inventor:
Thomas A Banning, Jr.

United States Patent Office 3,435,130

Patented Mar. 25, 1969

3,435,130

TELEVISION SYSTEMS AND OPERATIONS

Thomas A. Banning, Jr., 5500–5520 S. Shore Drive, Apt. 1408, Chicago, Ill. 60637

Continuation-in-part of applications Ser. No. 245,277, Dec. 17, 1962, Ser. No. 300,946, Aug. 8, 1963, and Ser. No. 383,144, July 16, 1964. This application July 29, 1964, Ser. No. 386,031

Int. Cl. H04n 9/02, 1/46, 7/16

U.S. Cl. 178—5.2 9 Claims

ABSTRACT OF THE DISCLOSURE

This case discloses various forms of emission of television programs or audio-radio programs, and reception of the same in a first degraded form of intelligible translation; with provision for receiving and translating such programs by pay or subscription receiver operation, as intelligible translations, without such first form of degradation, either in an inferior aesthetic quality without pay or subscription operation, or in a superior aesthetic quality by making pay or subscription operation.

Figure 1:
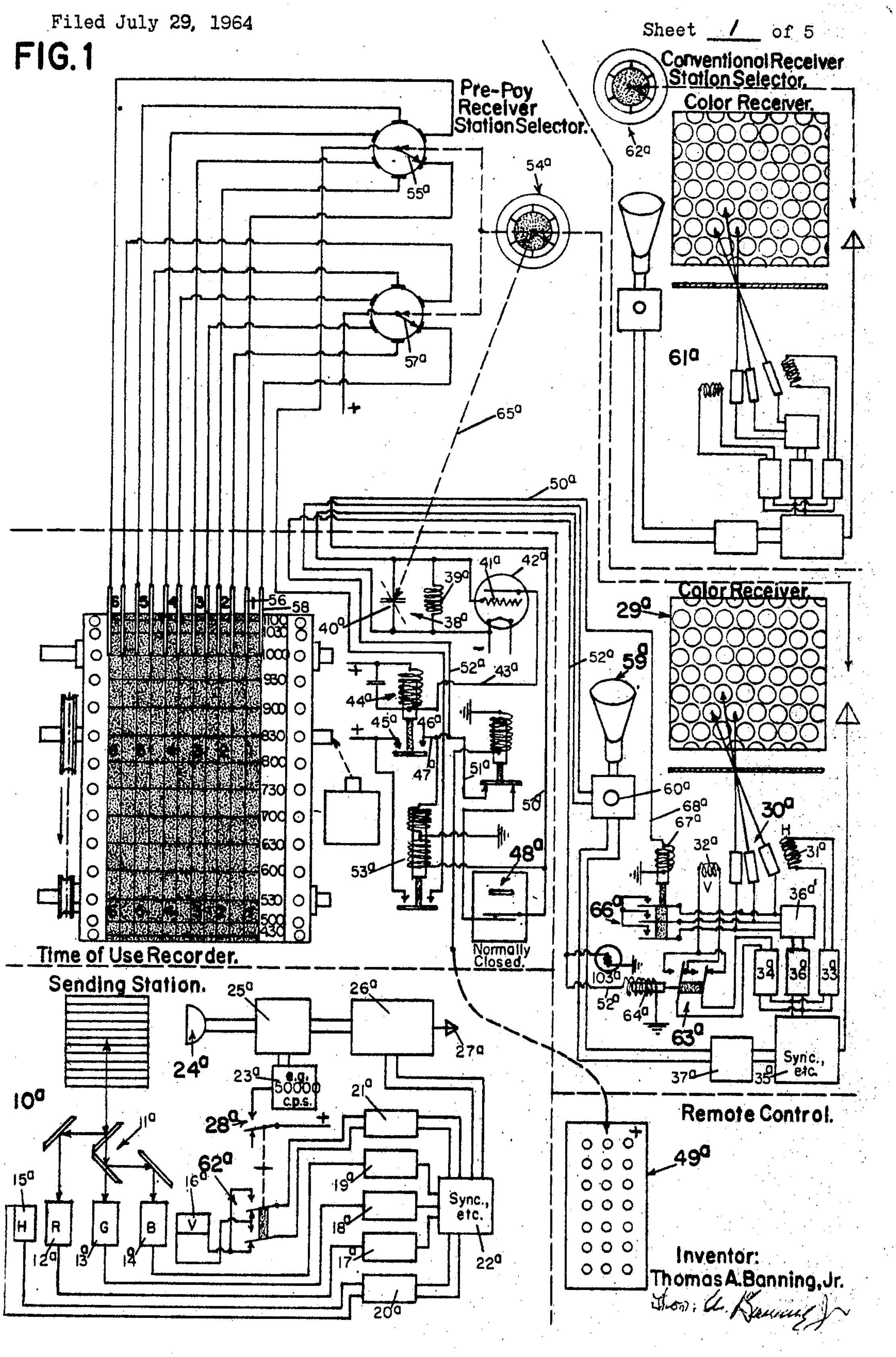

This application is a continuation-in-part of my earlier application, Ser. No. 245,277, filed Dec. 17, 1962, now Patent No. 3,222,452, issued Dec. 7, 1965, being a division of my earlier application, Ser. No. 597,950, filed July 16, 1956, issued Dec. 25, 1962, as Patent No. 3,070,652; and this application is also a continuation-in-part of my earlier application, Ser. No. 300,946, filed Aug. 8, 1963, issued Mar. 21, 1967, as Patent No. 3,310,624; and this application is also a continuation-in-part of my earlier application, Ser. No. 383,144, filed July 16, 1964, and allowed Nov. 20, 1967.

This invention relates to improvements in television systems and operations. The systems and operations hereinafter to be fully disclosed are usable in connection with "Pre-Pay" or "Subscription" television operations, and have been designed for uses included in such operations; but it will presently appear that certain of the features are also usable in connection with television systems and operations which do not require pre-pay or subscription in order that the translations of the received signals shall be of the maximum aesthetic quality.

In Letters Patent of the United States, No. 3,070,652, issued to me Dec. 25, 1963, and in additional presently pending applications, both divisional and original, I have disclosed means whereby television programs may be emitted from a sending station under conditions of emission or relations of signals, such that television receivers of presently conventional form may receive such programs without change in the structures or circuitry of such receivers, or presence of supplemental means or elements, to produce intelligible translations of the received programs, but translations which are not of the highest aesthetic quality available from the signals so emitted at the time. I have also, in said Letters Patent and various of said pending applications, disclosed arrangements, means, and operations, whereby such desirable results may be attained. I have also, in such patent and various of said pending applications, disclosed supplemental means, either constituting portions of the receivers or supplemental to such receivers, constituted to enable or cause such receivers which are provided with such supplemental means, to produce the translations in the superior aesthetic quality. I have also shown such supplemental means, when desired, as including either pre-pay or remote control means which, when activated, causes the supplemental means to become effective to produce the translated program to be in the superior aesthetic quality.

When all components of the televised program (e.g., both the video and the audio components) are emitted by radio transmission, and when it is desired that certain of such emitted programs be receivable and translated to produce intelligible translations to all receivers within receiving area of the sending station, including non-pre-pay or non-subscriber receivers as well as those receivers which include the supplemental means to enable reception in the superior quality translation, it is evident that until the supplemental means of the pre-pay or subscription group of receivers, or any receiver of that group, has its supplemental means activated, the receivers or receiver of that group will also receive the program in the inferior quality of reception, as respects the translation characteristic whose quality has been emitted in the manner to produce such inferior quality reception. Thus, for example, if the direction of vertical progress of the emitted scans is from bottom to top of the scanned area, the translations produced on all of the tuned receivers within the reception area will also be from bottom to top, and that translating operation will occur in those receivers which are provided with the supplemental correction means, as to which receivers the pre-pay has not yet been made, or as to which the remote control has not been activated. Such less than optimum translation in the pre-pay or subscription receivers will continue until the pre-pay or remote control is activated, whereupon correction of the direction of vertical progress to top to bottom of the raster will occur in such prepaid or remote controlled receiver or receivers.

Similar operational conditions will also occur when the emitting and receiving operations are on the basis of emission of color signals under conditions such that non-corrected reception in the receiver will produce wrong color areal sequence in the translation (e.g., blue, green, red, instead of red, green, blue); or translation as a "negative" picture instead of translation as a "positive" picture; or inclusion of an interfering hum signal in the audio translation instead of translation as a pure audio of the program signals; or reversal of horizontal scan of certain of the scans instead of translation of all of the scans in direction to correspond, scan by scan, with the horizontal directions of scans at the sending station. Such several operations are here mentioned by way of example of operations in which the reception translation produced in receivers of conventional type, and which are not provided with supplemental correcting means, will produce fully intelligible translations to such receivers, but of inferior quality. Corresponding fully intelligible translations will also be produced upon reception of such abnormal types of signals as suggested earlier in this paragraph (and others), by receivers which are provided with means to correct for such abnormalities, prior to activation of such supplemental correcting means.

It is thus evident that when such abnormal type signals are emitted, the conventional receivers (not provided with the supplemental correction means) and the pre-pay or subscription type receivers (provided with the supplemental correction means), will all receive the less aesthetic quality interpretation, that the higher aesthetic quality reception may be received by the pre-pay or subscription type receivers when the supplemental correction means is activated; but that, due to non-provision of the necessary supplementary correction means in the conventional receivers, they are unable to attain translation of the superior aesthetic quality.

It will be understood that the foregoing analyses concern themselves with multi-receiver systems wherein all of the receivers, both those of conventional type and structure and operation, as well as pre-pay or subscription type receivers, are included, and wherein when "ordinary" or non-subscription or non-pre-pay programs are being emitted, all such receivers, both conventional, whether monochrome receivers or color receivers and those receivers which are provided with the necessary supplemental correction means for pre-pay or subscription operation, are able to receive and translate such "ordinary" programs with the aesthetic quality of reception for which they are designed, and without activation of the supplemental correction means of the pre-pay or subscription type receivers—that is, without need of making pre-payment or incurring charge obligations for reception of such "ordinary" programs even in the pre-pay or subscription receivers. In other words, provision is made such that the receivers of both types are compatible for reception of the ordinary programs without pre-pay or charge, in the case of the pre-pay or subscription receivers, as well, of course, as the conventional receivers.

It is now noted, however, that although a special program is being emitted in manner to produce an intelligible translation in the conventional type receivers, but of degraded aesthetic quality (e.g., wrong color translation, or as a "negative" translation instead of a "positive" translation, or with vertical progress of the scans from bottom to top instead of from top to bottom, or with reversal of direction of selected scans without reversal of scan direction of all of the scans; or with inclusion of an interfering signal such as an audible hum frequency in the audio translation, instead of translation as a pure audio of the program signals); and although it may be accepted as a translation of sufficiently high aesthetic quality to meet translation requirements of the conventional receivers, it may nevertheless be desirable to make provision for reception and translation of such special program without inclusion of such degrading quality, even under the condition that pre-pay or remote control charge operation has not been made for such pre-pay or remote control receiver; and then to make further provision to enable translation of such special program in its highest aesthetic quality by making pre-pay or remote control charge operation.

An example of the application of the above stated desirable series of operations may be as follows: Assume that the color program now being emitted as a special program, is emitted as a "negative" instead of a "positive" program, so that the conventional receivers will translate the video signals in manner to produce a negative raster. In such case, such conventional receivers will all translate the picture in negative translation. This would provide a completely intelligible translation, but not of the highest aesthetic quality. Such "negative" signals would also be translated in the pre-pay or subscription charge receivers as a negative translation, in the absence of a pre-pay or remote control operation, and in the absence of supplemental means to correct from negative to positive translation in such pre-pay receiver. Such supplemental correction means may be and is provided in the herein disclosed structures and systems; but this special correction means causes the picture translation to be in an aesthetic quality less than the maximum quality which might be attainable, when pre-pay or remote control operation has not been made. Nevertheless, such a non-pre-pay or non-remote-controlled operation will actually produce the picture translation in a quality superior to that produced by the conventional receiver not provided with already mentioned supplemental correcting means.

Such an operation as outlined above is possible when the pre-pay or subscription receiver is provided with means to invert the received video signals, automatically as such signals are received and translated, so that a positive picture translation is produced in such pre-pay or subscription receiver without pre-pay or subscription charge. Thus a more acceptable translation of the video signals is made available to the operator of such pre-pay or subscription receiver, than is available to the operator and viewer of the conventional receiver. But in the case of such an automatic invertion of the received video signals it is evident that other provision must be made for production of the still higher grade of aesthetic translation of the received signals when the pre-pay or subscription charge operation has been made. I have made provision for production of such desired higher aesthetic quality of the received and translated picture when pre-pay or subscription charge is made, even when provision has been made for corrective inversion of the received signals as hereinbefore explained. Such further provision is as follows:

Provision is included in the hereinafter to be described embodiments, for causing the translation to be produced in the pre-pay or subscription receiver in monochrome (when the received signals are for color translation), until the pre-pay or subscription remote control operation has been made. When such pre-pay or subscription operation has been made, the translation is produced in full and correct color on the viewing screen of the pre-pay receiver, while also producing the picture translation on such viewing screen in "positive" form. At the same time, the conventional receiver (non-provided with the above explained correction features and equipment therefor), will produce to a viewer of the viewing acreen of such conventional receiver, a color translation, but in "negative" form.

While I have in the foregoing explanations referred to emission of the signals in inverted form to produce the non-corrected translation as a negative picture; and while I have also in such explanations referred to an operation in which the special program signals act to produce a monochrome translation in the pre-pay or subscriber charge receiver until the pre-pay or charge operation has been made, still I have used such several types of operations (negative vs. positive translation, and monochrome vs. full and correct color translation) only by way of illustration; and I shall hereinafter show and describe embodiments wherein one or both of such alternative forms of translation are other than those used in the above explanations.

Other objects and uses of the invention will appear from a detailed description of the same, which consists in the features of construction and combinations of parts hereinafter described and claimed.

Figure 2:
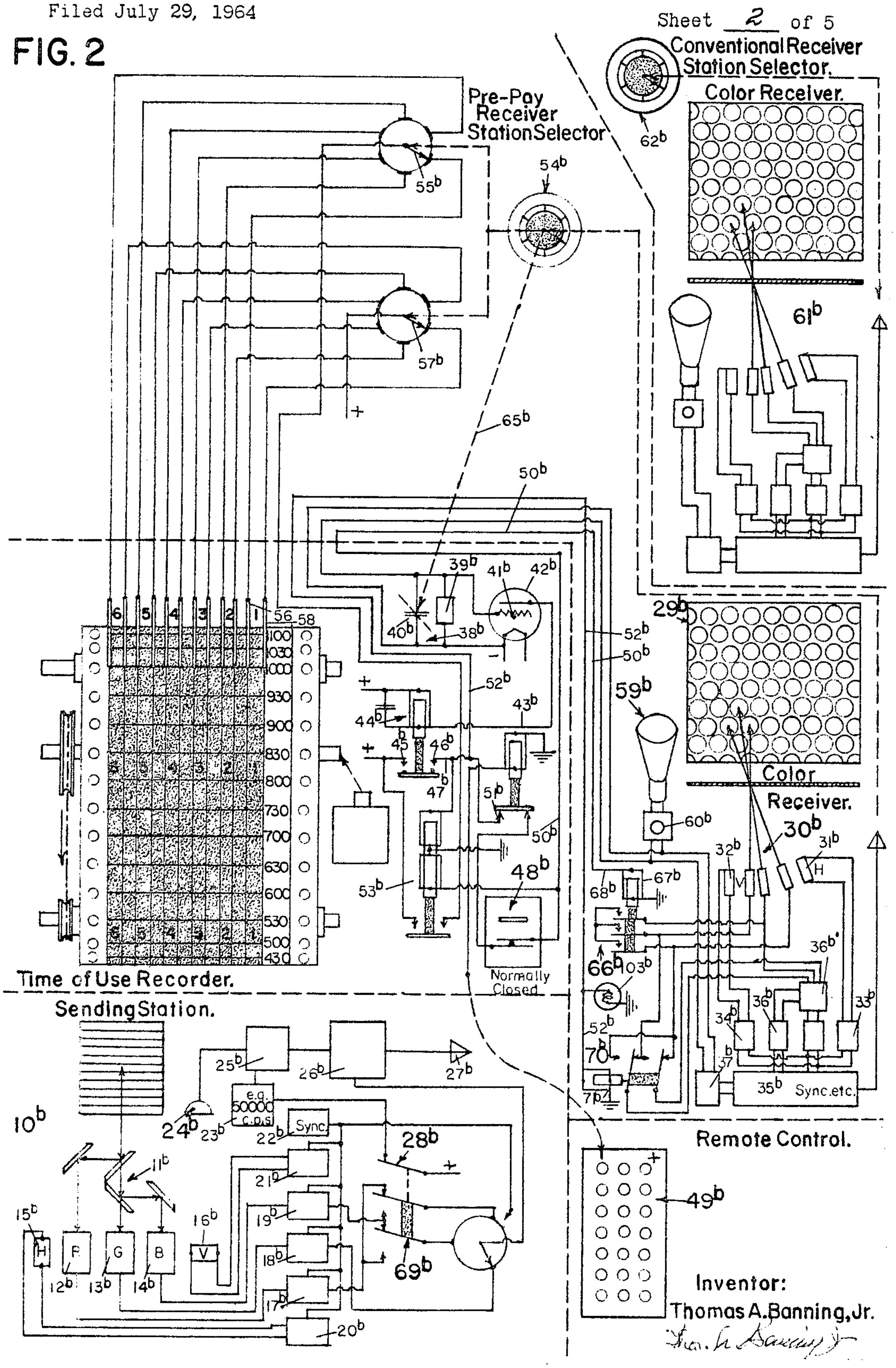

In the drawings:

FIGURE 1 shows schematically, a television system including a sending station provided with means to reverse the direction of vertical progress of the successive scans of a viewed object, and to produce and emit color signals corresponding to such reversed direction of vertical scan progress, and means to produce and emit audio signals corresponding to the audio component of the program being televised, and also including means to produce and emit a control signal; and this figure also shows schematically, a pre-pay or subscription television receiver provided with supplemental means to reverse the direction of vertical progress of the received and interpreted scan signals under control of the received control signal as long as such control signal is being emitted and received; and also shows means activated by the control signal prior to pre-pay or remote control, to produce monochrome translation and raster production from the received video signals; and also shows means activated by the pre-pay or remote control means when pre-pay or remote control is made, to produce translation of the received video signals and production of the raster in full color; and this figure also shows a conventional television receiver having no supplemental means for control of the direction of vertical progress of the received and translated scans, which conventional receiver will produce its raster according to present conventional practice, but upside down, from the received and translated signals;

FIGURE 2 shows schematically, a television system including a sending station provided with means to produce and emit color signals corresponding to a plurality of primary colors in a pre-determined spatial sequence of said primary colors, and including means to reverse said spatial sequence, and also including means to produce and emit audio signals corresponding to the audio component of the program being televised, and also including means to produce and emit a control signal; and this figure also shows schematically, a pre-pay or subscription television receiver provided with supplemental means to reverse the spatial sequence of signal components received and translated corresponding to the primary colors under control of the received control signal as long as such control signal is being emitted and received; and also shows means activated by the control signal prior to pre-pay or remote control, to produce monochrome translation and raster production from the received video signals; and also shows means activated by the pre-pay or remote control means when pre-pay or remote control is made, to produce translation of the received video signals and production of the raster in full color; and this figure also shows a conventional television receiver having no supplemental means for control of the spatial sequence of the signal components corresponding to the primary colors, which conventional receiver will produce its raster according to the reversed spatial sequence included in the signals emitted by the sending station.

Figure 4:
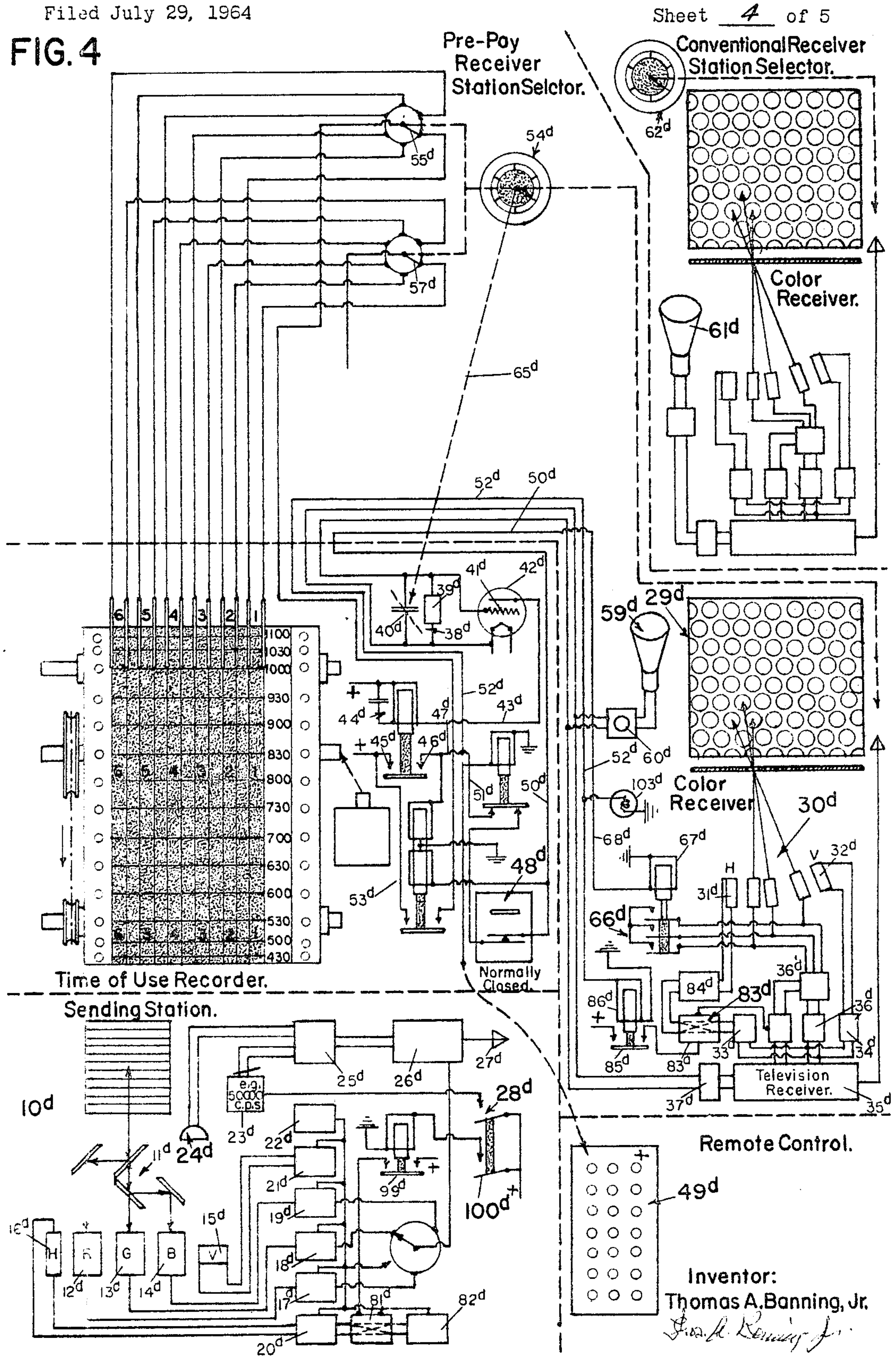
Figure 5:
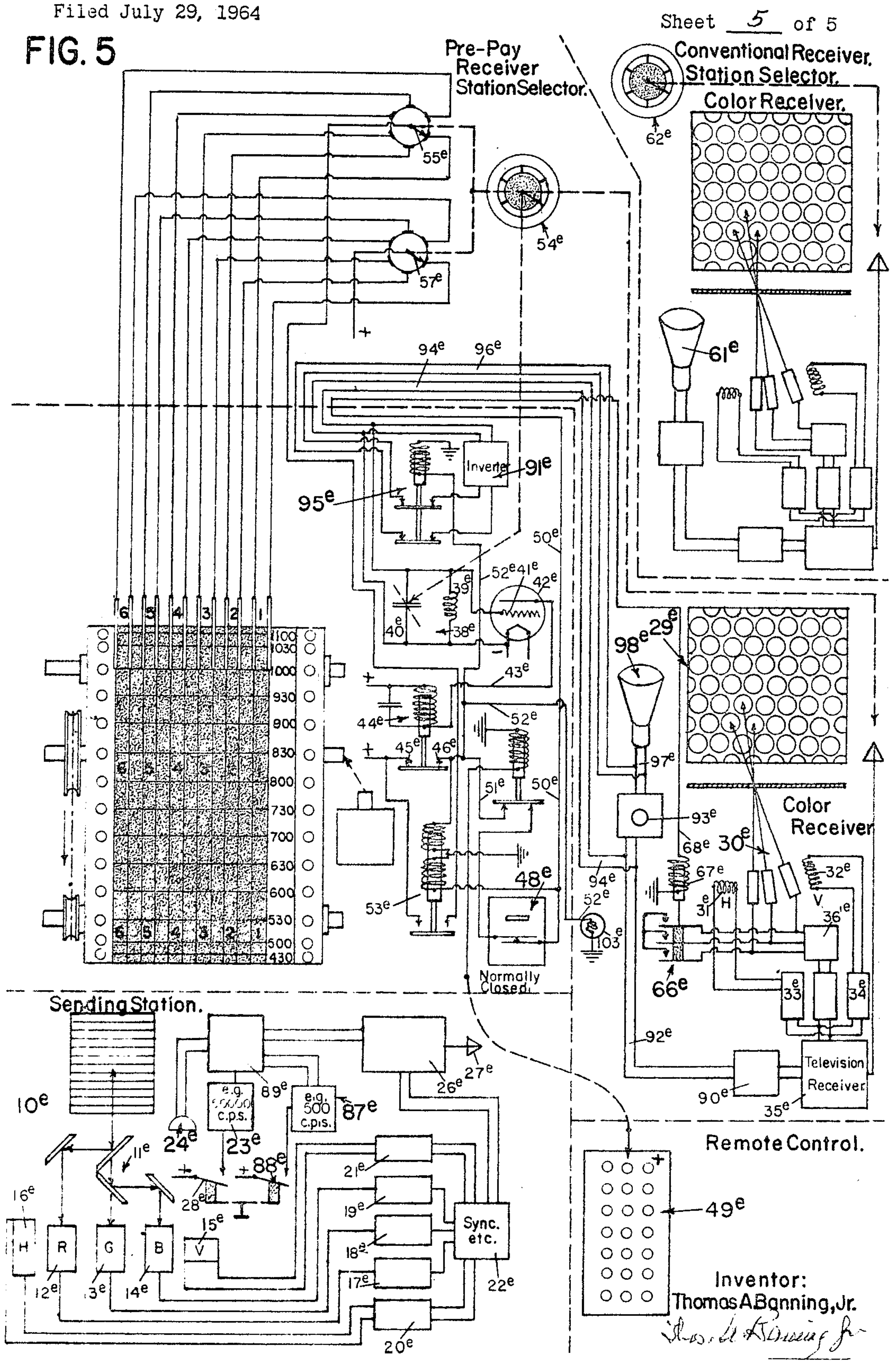

FIGUR E3 shows schematically, a television system including a sending station provided with means to produce and emit video signals which when received and translated in a conventional television receiver will produce a raster, together with means in said sending station to invert said signals corresponding to production of the raster produced by the receiver in "negative" picture form instead of "positive" picture form, said sending station also including means to produce and emit audio signals corresponding to the audio component of the program being televised, and also including means to produce and emit a control signal; and this figure also shows, schematically, a pre-pay or subscription television receiver including means to receive and translate the received video signals for production of a raster, including means to invert said video signals and translation, for production of a correspondingly inverted raster; and this figure shows supplemental means to activate said inverting means as long as the control signal is being emitted by the sending station and received by such receiver; and also shows means activated by the control signal prior to pre-pay or remote control, to produce monochrome translation and raster production from received color signals; and also shows means activated by the pre-pay or remote control means when pre-pay or remote control is made, to produce translation of received video color signals and production of the raster in full color from such received color signals; and this figure also shows a conventional television receiver having no supplemental inverting means, which conventional receiver will produce its raster in negative picture translation when the video signals emitted by the sending station are inverted;

FIGURE 4 shows schematically, a television system including a sending station provided with means to produce and emit video signals according to horizontal cross scans of a viewed object with progress of said scans vertically, wherein all such scans are produced by lateral beam deflection in a pre-determined direction, and which sending station includes means to cause selected scans to be produced by lateral beam deflection in opposite direction under control of the operator; and includes means to produce and emit audio signals corresponding to the audio component of the program being televised, and also includes means to produce and emit a control signal; and this figure also shows schematically, a pre-pay or subscription television receiver provided with means to receive and translate said video signals to produce horizontal cross-scans by lateral beam deflection in direction corresponding to the pre-determined lateral beam deflection direction of scan in the sending station to produce a raster; and said receiver including supplemental means under control of the received control signal, to reverse the scan direction of raster scans which are produced by the received video signals which correspond to the selected scans produced in the opposite direction at the sending station; and said receiver also includes means activated by the control signal prior to pre-pay or remote control to produce monochrome translation and raster production from received color signals; and also shows means activated by the pre-pay or remote control means when pre-pay or remote control is made, to produce translation of received color video signals for production of the raster in full color; and this figure also shows a conventional television receiver having no supplemental means for reverse of direction of the lateral beam deflections of said raster scans which correspond to the selected scans produced in the opposite direction at the sending station, which conventional receiver will produce its raster without reversal of scan direction of its scans which correspond to the opposite direction scans at the sending station; and FIGURE 5 shows schematically, a television system including a sending station provided with means to produce and emit video signals and also audio signals corresponding to the audio component of the program being televised, and also includes means to produce and emit a control signal; and said sending station also includes means to include in its emitted signals, an audible hum signal; and this figure also shows schematically, a pre-pay or subscription television receiver provided with means to receive and translate said video signals to produce a raster, and also includes a speaker and means to receive and translate the audio signals including the audible hum signal, and connections from such translating means to the speaker; and said receiver including supplemental means under control of the received control signal, comprising an audio inverter and connections between said inverter constituted to deliver an inversion of the audible hum to the speaker when the control signal is received; and said receiver also includes means activated by the control signal prior to pre-pay or remote control to produce monochrome translation and raster production from received color signals; and also shows means activated by the pre-pay or remote control means when pre-pay or remote control is made, to produce translation of received color video signals for production of the raster in full color; and this figure also shows a conventional television receiver having no supplemental means for inverting the hum signal when such signal is being received.

In each of the figures I have shown schematically, a sending station, a receiver provided with supplemental means to make possible the supplemental operations which enable such receiver to translate and produce on the viewing screen (or to produce by the speaker) various aesthetic qualities of the translated program, a control signal responsive unit constituted to respond to the control signal which is emitted during the emission of the special program being produced, recorder means constituted to make a record of times of use of the receiver the reception of various channel programs, and a conventional receiver which is also constituted to receive and translate the programs, including the special pre-pay or subscriber programs, and non-pre-pay or non-subscriber programs under conventional reception and translation, and without benefit of any supplemental equipment not included in such conventional receiver. Inasmuch as the control signal which is emitted only for ensuring proper functioning of the supplemental means or equipment, may comprise a signal emitted in any convenient manner and receivable by the equipment of the pre-pay or subscriber receiver or supplemental to such receiver, such signal may be transmitted as an audio signal, either constituting a portion of the video or audio signals of the program or as a separate signal; or such control signals may be transmitted and transmitted by wire or conductor transmission, and it is desired in the receiver or the audio signals for the special program may be transmitted and transmitted by wire or conductor transmission. In the present application, I have shown all such signals, including both the control signals and the video and audio signals, as transmitted as broadcast signals, but it is contemplated within the claims to be hereafter defined to cover such audio broadcast transmission, as it may within my invention use such claims. Various of the station arrangements and separation of transmission may also be incorporated in systems where one or more of the signals—control signals, video signals and audio signals—may be transmitted by wire or conductor, and where such modified systems are disclosed in the appropriate application previously referred to, or mentioned above.

Since various of the elements illustrated in the several embodiments are also used in other embodiments, in the common form or in a similar form, such elements shall be identified by the same reference numerals, with different prime designations corresponding to the several embodiments, by prime, double prime, and the like. Accordingly, in the first described embodiment the elements are identified by numerals without prime notation.

The sending station shown in the embodiment is designated by the numeral 101, comprising a conventional television or image producing unit including the conventional video and audio responsive elements 12, 13 and 14 for the primary video, the video and audio elements 15 and 16, respectively, and corresponding to the elements 17, 18 and 19, 12, 13 and 14, respectively, and supplemental units 20 and 21, respectively, the synchronizing control unit 22, the control signal generator 23, the control unit 24, the unit 25 forming the second signal with the audio or control unit, the television transmitting unit 26, and the antenna 27. Each such illustrated embodiment also includes the element 28 which serves to actuate the corresponding control signal unit 23 to cause transmission of the control signal. Conveniently such control signal may comprise a constant frequency supersonic signal, introduced into the audio frequency system or connection, and which is a supersonic frequency signal which can be separated from the video signals received and translated by the receiver by the conventional broadcasting, as shown in connection with the receiver equipment. As suggested, a supersonic frequency may be 50,000 c.p.s., and the supplemental equipment for the supersonic receiver will then be the supersonic receiver suitable to receive the predetermined control frequency to actuate the further elements of such receiver.

Additionally each illustrated sending station includes the elements or units individually of the operations to be performed by the special sending stations as will presently appear.

Each of the schematically illustrated receivers includes the three conventional arrays 29, the three generating groups 30, with groups connected and arranged to project the three elemental colors of the image, causing the primary image to excite the video of the colors of the array, and to produce a dot of colors corresponding to the colors of the control signals of each element proportional (or inversely proportional) to the strength of the component of the received signal (video) supplied to the control grids or other elements of the guns 31 and 32, respectively. The control grid effecting means are shown at 33 and 34, respectively. A control receiver unit is shown at 35 delivering the proper signal components to such signals to such controls 33 and 34, and also to a control unit 36 of the tube. Such unit 36 includes means to receive the signals delivering the corresponding audio, the video component of the three signals of the strength corresponding (directly or inversely proportional) to the color excitation to be produced by the color intensity effected by the several elements.

The unit 36 thus includes means and circuitry to deliver and control the received signal and produce the signals (at each instant) individually corresponding to the strengths of the received components (directly or inversely proportional thereto). The unit 36 also includes proper synchronizing means to control various of the receiver elements, according to conventional practice.

Each illustrated receiver also includes the resonant unit 37 by which the audio frequency (and control frequency) signals are separated from the received signals, and are delivered as a combined audio and supersonic frequency set of signals. The audio frequency signals are delivered and are received by the speaker and translated in conventional manner to produce the audio component of the translated program. The supersonic frequency signals are delivered to supplemental equipment including a resonance unit 38 conventionally comprising an inductance element 39 and the variable capacitor 40 in parallel. By varying such capacitor under proper control, the resonance frequency of the resonance unit may be changed to correspond to the frequency of the control signal being emitted by the sending station intended for reception of its program. This will be referred to later herein.

The response of the resonance unit to a received control signal (of corresponding supersonic frequency) will produce a potential at the grid 41 of the tube 42, with a resulting flow of current and delivery of current to and potential over the line 43, to actuate the relay 44, with closing of its contacts 45 and 46, and supply of potential to the line 47. Said line 47 then delivers current to such supplemental units as are provided in the proper receiver to produce intended operations, as will hereinafter appear. Included in the supplemental units thus supplied will be, when the resonant condition occurs, a unit for altering the characteristic quality of the translation of the special program produced to control the relay or control box 48, or to operate the remote control unit 49. The line 50, which hereinafter referred as the control signal being received, and the unit which relay or remote control operation is provided. Such operations have been fully exemplified in my said patent No. 3,076,525 and various of said pending applications. Potential to supplemental elements such as line 51 under such relay or remote control by the line 52 connected to the line 47. Thus, unit relay or remote control operations include such line 50 when the signals associated with the special program control signals are being received.

Another line 52 also connects to the line 47 but with the intervention of the relay or remote control unit 53. Thus such line 52 will be energized as long as the special program control signal is being received, and regardless of whether or not relay or remote control operation has been made.

In each embodiment the differential relay 55 serves to provide potential for producing the time recording of acceptance of the special program with identification of the station which is delivering the reception. Such tuning is effected by the tuning motor 54 which acts through the movable contact 55 to place potential on the stylus 56 to produce recording of the tuning of the special program and the fact of relay or remote control operation of such special program that is made. Such tuning motor 54 also acts through the movable contact 57 to place potential on the stylus 58 to produce recording of the tuning of whatever program may be, at the time, emitted by the sending station when a special program is "ordinary" program. Such arrangements are also disclosed in the patent, No. 3,070,652, and various of the pending applications. It is now noted, however, that although each of the herein disclosed embodiments includes provision for receiving the special program in an inferior aesthetic quality, the tuning and use of reception of such special program in such inferior aesthetic quality is not recorded, but record is made of reception of such special program when pre-pay or remote control of reception of such special program is being made in its superior quality of aesthetic translation.

Each of the embodiments herein illustrated also includes a speaker 59 to translate the audio component of the received signals under control of the volume control button 60.

Each of the illustrated embodiments also includes a schematic showing of a conventional color receiver 61 similar to the showing of the receiver for the pre-pay or remote control programs, but without provision of any supplemental units or circuitry than such as may be provided for uses not related to the uses herein disclosed. Such conventional receiver is provided with its own tuning button or selector 62; and for the purposes of this discussion such selector 62 has been shown as moved to position to tune and receive the same program as is being received by the pre-pay or remote control receiver already described.

I shall next describe and explain the operation of the further supplemental units or equipment shown in each of the embodiments, and the operations thus made possible in the use of a receiver provided with such supplemental units but not possible in the use of the correspondingly illustrated conventional receiver.

Accordingly, the embodiment shown in FIGURE 1 is one in which the sending station is provided with means to reverse the direction of vertical progress of the successive horizontal scans, to produce such progress from bottom to top of the field of vision instead of from top to bottom. If it be assumed that the conventional direction of such vertical progress is from top to bottom of the field of vision, then the receiver is provided with vertical deflection means which will also produce the vertical progress, top to bottom. But it is evident that reversal of the vertical progress to one which is from bottom to top in the sending station, without corresponding reversal of such vertical progress in the receiver, the raster produced on the viewing screen of such receiver will be upside-down. Accordingly, in the showing of FIGURE 1, the picture produced by the conventional receiver 61 will be an upside-down picture when the reversing switch 62 of the sending station is shifted to its raised position (not its lowered position as shown in that figure). The raster and picture produced on the viewing screen of the pre-pay or subscription receiver of FIGURE 1 would also be upside-down in the absence of a reversing switch and means to operate the same under proper conditions of such operation. Accordingly, I have provided the reversing switch 63 connected into the circuitry of the vertical deflection unit 32, so that when such switch 63 is shifted to reversed position (from that shown in FIGURE 1), the vertical direction of progress of the scans will be reversed to the operation of from bottom to top, thus matching the vertical progress of the received scans with the changed vertical progress of the sending station scans. Under such condition the raster produced on the pre-pay or subscription receiver will now be right-side up instead of upside down. The activation of such reversing switch is produced automatically when the control signal is received, so that correction to a bottom to top reception will occur automatically with the incoming of the special program with its control signal. This result is produced as follows:

The solenoid 64 of the reversing switch 63 is connected to the line 52, already referred to, which line 52 is automatically electrified by the reception of the control signal, the resonant unit 38 being tuned to the frequency of that control signal by shift of the variable capacitor 40 as the selector button 54 is moved to position to tune the channel on which the special program is being emitted; the variable capacitor 40 being connected to the selector button as indicated by the dashed line 65. Thus, the erroneous direction of vertical progress of scans in the sending station is matched by the corrective operation automatically produced in the pre-pay or subscription receiver. No such correction is produced in the conventional receiver, however, so that receiver will produce a fully intelligible translation, but one which would generally be regarded as unacceptable.

Next: The pre-pay or subscription receiver is also provided with means to automatically cause the received and translated video signals to produce a monochrome raster and picture when the special program is being received with its control signal. This result is produced by inclusion in the supplemental equipment, the switch 66 with means to connect all three of the guns together so that at all times during such cross connecting, all of the guns will receive color signal components of the same intensity, thus producing a combined illumination which will produce white light. The solenoid 67 of such switch is activated by connection of the line 68 to the line 50 which is also electrified automatically by the resonant operation of the unit 38 by the received control signal, it being assumed so far that neither pre-pay nor remote control has been produced. Upon production of pre-pay or remote control, electrification of such line 50 will terminate, with corresponding termination of current supply to the solenoid 67 of the relay 66, and concurrent opening of the switch and restoration of the circuitry to the guns, and related elements, to the normal condition for production of full color raster production.

The several operational conditions produced by the embodiment of FIGURE 1, are as follows:

For reception and translation of an "ordinary" program (not pre-pay or remote control), the conventional receiver 61 will receive and translate such program right-side up, and in full color, assuming that the emitted signals are for a color program. The pre-pay or subscriber receiver will also receive and translate such program, right-side-up and in full color, without pre-pay or remote control.

For reception and translation of a "special" program, the conventional receiver will receive and translate such emitted signals to produce a raster up-side-down and in full color. The pre-pay or subscriber receiver will receive and translate the signals for such program right-side-up, but in monochrome, when pre-pay or remote control has not been made. Under pre-pay or remote control operation such pre-pay receiver will receive and translate such signals right-side-up, and in full color. If the special program extends beyond the time interval for which pre-pay has been made, the operation of such pre-pay or subscriber receiver will immediately restore to the non-pre-pay operational conditions above defined.

In the embodiment shown in FIGURE 2, I have made provision for emitting the color signals in a non-conventional spatial relation. Under this condition the red and blue-violet (or other color pair) signal components are spatially reversed, the blue-violet supplanting the red, and the red supplanting the blue-violet. Since the electron beam excitable elemental areas of phosphor retain fixed spatial relationship on the target of the kinescope (the elemental areas for red, green, and blue-violet in any selected three color dot array remaining in fixed spatial relationship), and since each beam produced by a gun is always trained to excite that elemental area having a pre-determined position in the array (e.g., the peak position), it follows that reversal of the spatial relation of the red and the blue-violet excitations produced by received and translated video signals, will cause a red producing elemental area to be subjected to a beam of strength intended for a blue-violet elemental area, and per contra, to cause a blue-violet producing elemental area to be subjected to a beam of strength intended for a red elemental area. Accordingly, reversal of the spatial relation of the signal component producing elements of the sending station, produced by reversal of the connections to or from such elements, and reception and translation of such non-conventional spatial relation produced signal componens, by the conventional receiver, will produce wrong color translation of the program so signalled.

Such a wrong color raster production will also occur in the pre-pay or subscriber receiver, in the absence of provision of correction means in such receiver, constituted to correct for such wrong color production. Accordingly, I have, in the embodiment of FIGURE 2, included the reversing switch or relay 69 in the sending station, which switch normally stands in position to emit the color signal components, in conventional spatial relationship. This switch, when reversed (into the position shown in FIGURE 2), will reverse the connections to the color component elements 12 and 14 so that such two color components will be of interchanged intensity, the intensity of the color element 12 now being delivered to other sending station units in place of the intensity of the color component 14, and vice versa. Thus when the switch 69 is moved to its reversed position (shown in FIGURE 2) the color components will be spatially wrong for correct interpretation by the conventional receiver.

Such wrong spatial color components will also be received and interpreted by the receiving station. I have provided means, in the form of the reversing switch 70 for correcting the spatial relations of excitation of the elemental color areas of the target, to produce thereon a correct color raster. Such correction reversing switch 70 operates in manner similar to the operation of the switch 69 of the sending station. The solenoid 71 of the switch 70 connects to the line 52 which is electrified whenever and as long as the control signal is being received by the receiver in question. Accordingly, when the special program, with its control signal is emitted, the switch 70 will be shifted to the position shown in FIGURE 2, and correct color translation will be produced in such pre-pay or subscriber receiver.

The pre-pay or subscriber receiver shown in FIGURE 2 is also provided with the bridging switch unit 66 which, when its solenoid 67 is energized, will gang all of the color component connections to the several guns together, to thus cause all of the guns to deliver beams of equal intensity to the elemental areas of each dot array, with production of monochrome raster.

The several operational conditions produced by the embodiment of FIGURE 2, are as follows:

For reception and translation of an "ordinary" program (not pre-pay or remote control), the conventional receiver 61 will receive and translate such conventional program in correct color, assuming that the emitted signals are for a color program. The pre-pay or subscriber receiver will also receive and translate such conventional program in correct colors.

For reception and translation of a "special" program, the conventional receiver will receive and translate such emitted signals to produce a raster of incorrect colors. The pre-pay or subscriber receiver will receive and translate the special program signals in monochrome when pre-pay or remote control has not been made. Under pre-pay or remote control operation such pre-pay or subscriber receiver will produce the special program raster in correct color. If the "special" program extends beyond the time interval for which pre-pay has been made, the operation of such receiver will immediately return to the non-pre-pay operational conditions above defined.

Figure 3:
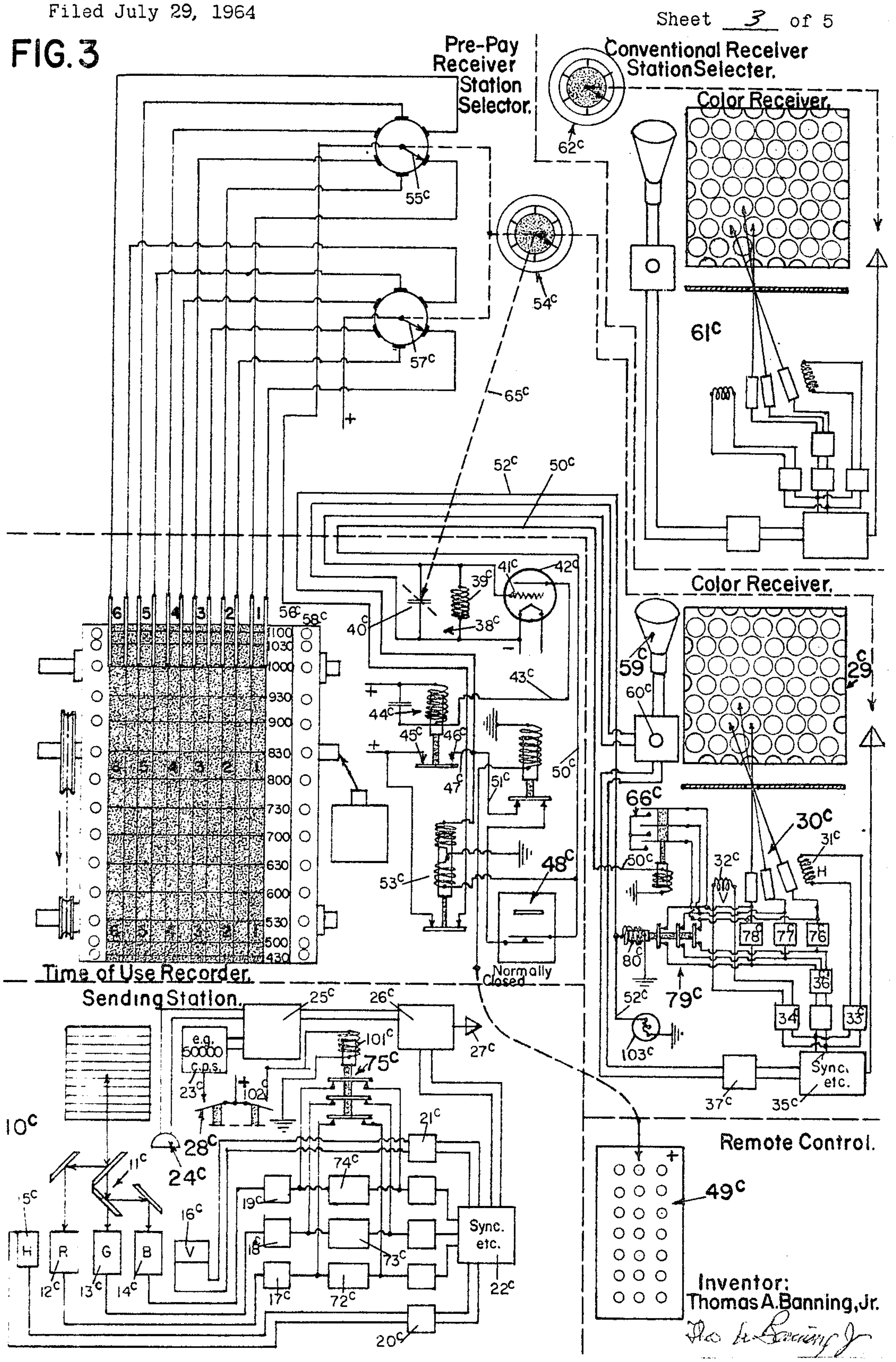

In the embodiment shown in FIGURE 3 provision is made for emitting the video signals under inverted strength as compared with a conventional emission of such signals. Under these conditions the raster produced by the receivers will be a "negative" instead of a "positive" picture. To enable such operations, the following provisions have been made in the sending station:

A signal strength inverter is introduced into each of the lines extending from the several color units 12, 13 and 14, to the unit 22. These strength inversion units are the units 72, 73 and 74; and I have also provided the switch unit 75 having pairs of contacts corresponding to the inverters, together with bridging connections across each of the inverters, the pairs of switch contacts corresponding to the inverters being so connected that when the switch 75 is in its closed position all of the inverters are bridged, thus preventing signal strength inversion of each of the color signals. On the other hand, when the switch is shifted to open position by energizing the solenoid 101 under control of the switch 102, the bridging connections are broken, thus cutting an inverter into each such connection. Under these conditions, the color signal components delivered to the unit 22 will all be strength inverted, and the signals emitted by the sending station will be strength inverted color signals. As such they will be received by the receivers, and in the absence of correction means in a receiver, a negative raster instead of a positive raster will be produced.

The pre-pay or subscription receiver is provided with a series of signal strength inverters 76, 77 and 78 in the lines extending directly from the unit 36 to the several guns, so that whenever such inverters are made effective the color component signals to the guns will produce signal strength inverted gun intensity beams to excite the corresponding incremental color areas of the target. I have also provided the switch unit 79 with the pairs of contacts corresponding to the several inverters, together with bridging connections across the inverters and including such contacts. Accordingly, when the switch is in its closed position (shown in FIGURE 3) all of the inverters will be bridged, and made ineffective for signal strength inversions. On the contrary, when the switch solenoid 80 is electrified, all of the bridging connections will be opened, and all of the inverters will become effective for inverting the several color component signals delivered to the guns. The line 52 connects such solenoid to the line 47, so that whenever the control signal is being emitted and response produced by the oscillator 38, potential and current will be delivered to the solenoid 80, thus breaking the bridging connections, and rendering the inverters effective. This result will occur whenever the control signal is being emitted by the sending station—that is, during the sending of a "special" program.

Such receiver inverters will, when made effective, produce a correcting effect, thus strength re-inverting the inverted emitted color components, and restoring the receiver operation to a condition under which the raster will be produced as a "positive" picture instead of a "negative" picture.

No such strength inversion units are provided in connection with the conventional receiver.

The several operational conditions produced by the embodiment of FIGURE 3, are as follows:

For reception and translation of an "ordinary" or conventional program (not pre-pay or remote control), the conventional receiver 61 will receive and translate such program in correct color and as a "positive" picture. The pre-pay or subscriber receiver will also receive and translate such program as a "positive" picture.

For reception and translation of a "special" program, the conventional receiver will receive and translate such emitted signals to produce a raster in "negative" form. The pre-pay or subscriber receiver will receive and translate the signals in monochrome "positive" translation when pre-pay or remote control has not been made. Under pre-pay or remote control operation such pre-pay or subscriber receiver will continue to produce the raster as a positive, but full color picture. If the special program extends beyond the time interval for which pre-pay has been made, the operation of such receiver will immediately restore to the non-pre-pay receiver operational conditions above defined.

In the embodiment shown in FIGURE 4 provision is made for reversing the lateral direction of scan of preselected and pre-determined lateral deflection scans produced in the sending station equipment. When the video signals corresponding to such scanning operations are received and translated in a conventional receiver, it is evident that the signals corresponding to such reversed direction produced scans will still be translated on the raster by non-reversed directional scanning. Thus there will be intermixed in the raster, portions of the picture facing the wrong way—that is, what should appear at the left-hand side of the scan will actually appear at the right-hand side, what should appear one-fourth of the scan length from the left-hand end of the scan will actually appear one-fourth of the scan length from the right-hand end of the scan, and thus through the full scan across the raster. By designing the reversing means and the controls therefor, in the sending statoin to produce such reversals periodically for a pre-determined number of scans, followed by non-reversals for another pre-determined number of scans, again followed by reversals for the pre-determined number of scans, and thus through the complete number of scans contained in the field of scans (263 for the main field, and 262 for the interlace field), a pre-determined amount of degradation of the quality of the raster produced from such scans as received and produced on the receiver's raster, will be produced.

By providing in the pre-pay or subscription receiver, means to reverse those raster scans which correspond to the reversed scans produced at the sending station, all of the scan directions of the receiver produced raster will be directionally the same. Accordingly, such correction means will serve to produce the picture on the receiver viewing screen in the increased aesthetic quality desired. Such correction means is shown in FIGURE 4. in that figure I have included the reverser unit 81 in the lines connected to the horizontal lateral deflection producing unit 15, such reverser unit including means constituted to reverse the scan direction when such reverser unit is activated by input of current supplied when the switch 99 is closed by closing of the switch 100. I have also shown in said figure the control unit 82, and have shown both the reverser unit 81 and the control unit 82 connected to the synchronizing signal means, to properly synchronize the reversals and the durations of such reversals (that is, the member of scans which will be produced in reversed direction), with the other scan producing and controlling means, to effect the reversals according to the pre-determined program of such reversals, already referred to herein.

Such direction reversed scans will be received and translated in the receivers (either conventional or pre-pay, or both), and there translated. The pre-pay or subscription receiver is provided with reversing means and controls, and activating means therefor, similar to corresponding units of the sending station. Thus, the reverser units 83 and 84 correspond to the units 81 and 82 of the sending station, with both of such units connected into the synchronizing signal unit for proper synchronized control. Such control is such that the reversal operations produced in the receiver will correspond, as to translated scans, and as to numbers of scans included in each reversed group, to like operational conditions produced in the sending station equipment. Accordingly, as long as such receiver correction equipment is properly activated, the incorrect direction produced scans will be received and translated, and used for production of correct direction scans on the raster. I have shown in FIGURE 4 the relay 85, connected to the unit 83, and constituting switch means constituted, when energized, to activate the scan reversing means, as long, and for as many scans, as correspond to the improper direction produced scans and signals, in the sending station.

Such relay switch as schematically shown, includes the activating solenoid 86, connected to the line 52. Since such line 52 is connected to the line 47, which line 47 is electrified as long as the control signal is being received, it follows that during the progress of the "special" program (during which time the control signal is being emitted), the relay switch 85 will be closed to activate the scan direction correcting means. Accordingly, the program translated, and the raster produced during progress of the "special" program will include properly produced directional scans over its area. Since the conventional receiver does not include scan direction correction means, it is evident that such "special" program will be produced on the raster of the conventional receiver, with incorrect scan direction for its scans which correspond to reversed direction scanning in the sending station.

The pre-pay or subscriber receiver shown in FIGURE 4 is also provided with the monochrome raster producing means, constituted and operated according to the disclosures already described herein, for producing the monochrome translation of the raster of the pre-pay or subscription receiver, when pre-pay or remote control has not been made.

The several operational conditions produced by the embodiment of FIGURE 4 are as follows:

For reception and translation of an "ordinary" or conventional program (not pre-pay or remote control), the conventional receiver 61 will receive and translate such program without reverse of scan direction of any scans, and in full color, assuming that the emitted signals are for a color program. The pre-pay or subscriber receiver will also receive and translate such program without reversal of scan direction of any scans, and in full color, without pre-pay or remote control.

For reception and translation of a "special" program, the conventional receiver will receive and translate the emitted signals to produce a raster which will be imperfect largely in proportion to the number and grouping of the emitted lateral deflection scans which have been produced in reversed direction; and such program will be produced in full color. The pre-pay or subscriber receiver will receive and translate the signals for such program with the scanning of all scans in correct direction, but in monochrome, when pre-pay or remote control has not been made. Under pre-pay or remote control operation such pre-pay receiver will receive and translate such signals with the scan directions of all scans correctly produced, and in full color. If the special program extends beyond the time interval for which pre-pay has been made, the operation of such pre-pay or subscriber receiver will immediately restore to the non-pre-pay operational conditions above defined.

In the embodiment shown in FIGURE 5, I have made provision for emitting an interfering audible signal incorporated with the emission of the program audio signals, so that reception of such interfering audible signal during translation of the audio component of the program will render the audio reception unacceptable, and as a consequence the viewer (and listener) of the program will either shut off the speaker or discontinue reception of the program. In the embodiment disclosed in this figure, provision has been made in the sending station for emitting such interfering audio signal during emission of the "special" program; and the pre-pay or remote control receiver has been provided with means to introduce an audio signal inversion of such interfering signal, into the signals delivered to the speaker, thus nullifying or cancelling out the interfering signals, and producing the audio component of the program without such interference.

In such FIGURE 5 I have shown the oscillator unit 87 as part of the equipment of the sending station. Upon activation of such unit by closing the switch 88, the interfering signal of audio frequency (e.g., 500 c.p.s.) will be produced, and will be delivered to the unit 89 for inclusion in the audio component signals to be emitted, either as a part of the radio signals, or otherwise. Such interfering signals will be received by the receiver, and will be translated as interfering audio contained in the signals delivered to the speaker, unless eliminated or counterbalanced in manner effective to produce non-interference in the signals transmitted to the speaker.

The signals received and translated by the receiver are controlled by the sound trap 90 which passes all of the audio frequency signals, including such interfering frequency signal. I have provided an audio signal inverter 91 as a portion of the supplemental equipment. The audio signals from the sound trap are delivered over the lines 92 to the speaker control unit 93. Branch lines 94 extend from such lines 92 to the audio signal inverter unit 91, and from such inverter unit to the switch relay unit 95. The output lines 96 extend from the inverter unit back to the lines 97 which connect the unit 93 to the speaker 98. Accordingly, if the switch 95 were to remain open the inverted signals would not be introduced into the audio signals delivered to the speaker. However, I have provided means to close the switch unit 95 when the control signal is being received. Thus, as long as the control signal is being received and translated, such switch 95 will be and remain closed to cause the inverted audio interfering signals to be introduced into the audio component of the "special" program. Thus such audio component will be swept clear of the interfering signals and audio, delivered to the speaker.

The several operational conditions produced by the embodiment of FIGURE 5, are as follows:

For reception and translation of an "ordinary" program (not pre-pay or remote control), the conventional receiver 61 will receive and translate such program without interfering audio and in full color, assuming that the emitted signals are for a color program. The pre-pay or subscriber receiver will also receive and translate such conventional program, free of interfering audio, and in full color, without pre-pay or remote control.

For reception and translation of a "special" program, the conventional receiver will receive and translate such emitted signals to produce a raster in full color; but the interfering signal audio hum will be contained in the audio produced by the speaker, thus producing an objectionable overall reception. The pre-pay or subscriber receiver will receive and translate the signals for such program without the interfering audio hum, but the raster will be produced in monochrome, when pre-pay or remote control has not been made. Under pre-pay or remote control operation such pre-pay receiver will receive and translate such signals in full color and without the interfering audio hum. If the program extends beyond the time interval for which pre-pay has been made, the operation of such pre-pay or subscriber receiver will immediately restore to the non-pre-pay operational conditions above defined.

In each of the figures the unit 23 is shown, being a unit constituted to emit the control signal of super-sonic frequency when activated by input of current under control of the switch 28.

In each of the embodiments herein shown and described, the sending station is shown as provided with a switch by which the control signal is made operative or non-operative, and with another special function switch by which the special function constituting a portion of the special operations of such embodiment, are made operative or inoperative. Since the control signal is operative only during emission of a "special" program, and is not needed at other times, I have, in each of FIGURES 1, 2, 3, 4 and 5 indicated a ganging connection, either mechanical or electrical, between the special function switch of such embodiment, and the control signal switch of such embodiment. Accordingly, neither of such switches may be closed without closure of the other, and likewise, both of the switches must open concurrently.

I have provided signal means to notify the operator of each of the pre-pay or subscriber receivers when a "special" program is being sent out from the sending station. Such means is shown in the form of a signal light 103 conveniently mounted on the pre-pay or subscription receiver for ready visibility. Such signal light is connected to the line 52 which is electrified when the control signal is being emitted and response to reception of such signal is being produced, at the pre-pay or subscription receiver in question. Such signal light will, when illuminated, inform the operator of such receiver of the fact that such "special" program may be translated.

The following features of operation are common to all of the illustarted embodiments:

In each case the operator of the pre-pay or subscription receiver is given a choice between translation of the "special" program in either the inferior or the superior aesthetic quality. But the inferior quality reception will, in each case, be produced upon tuning to the sending station frequency or channel producing such program, without need of making pre-pay or remote control. Thus, the operator may judge as to whether or not he desires to incur the expense of making pre-pay or notifying the subscription station of his selection of the superior quality reception, prior to incurring such expense or charge.

Next: In each of the embodiments provision is made for producing a degraded or inferior quality of reception in any receiver within receiving range of the sending station producing the "special" program. Such inferior quality of reception is, however, an intelligible reception. A specially equipped receiver is not needed to make the intelligible reception possible. This may then be called a first degraded quality reception of the "special" program. It is of a nature such that all presently conventional receivers may translate such "special" program as thus degraded. Thus presently conventional receivers are compatible to reception of such first degraded quality "special" programs.

Next: The pre-pay or subscription receivers are provided with means constituted to correct the above degrading features of the operation. This correction is produced automatically and simultaneously with reception of the "special" program signals. The correction is automatically produced by the translation of the control signal when the "special" program comes on. Thus, in absence of any other special operational condition in the pre-pay or subscriber receiver, such correction would at once cause such pre-pay or subscription receiver to translate the received "special" program in its highest aesthetic quality. I have, however, also provided means to enable production of a partially degraded translation of the program, as follows.

Next: Simultaneously with reception of the "special" program control signal, the so far corrected translation is degraded to cause production in, for example, monochrome, instead of full color. Thus, having made correction for the first degrading quality of reception, provision is now made for simultaneously causing production of an intermediate quality reception and translation, namely, as above suggested, monochrome instead of full color. Production of this intermediate quality reception does not require pre-pay or remote control operation.

Next: Upon now making the pre-pay or remote control operation, the raster will be produced in full color instead of monochrome. The provision of the intermediate quality translation, which is, however of excellent quality but not color, without pre-pay or remote control operation, enables the operator of the pre-pay or remote control receiver to judge whether or not he wishes to incur the expense or obligation incident to changing the operation to full color instead of monochrome.

It will be understood that when I have herein referred to such choice of reception as being a choice between monochrome or full color, the naming of such two qualities of reception is not intended as a limitation to the scope of the protection to be hereinafter defined in the claims, except as I may specify the terms "monochrome" and "full color" in limiting manner. Thus, for example, the units 63, or 70, or 79, or 83–85, or 91–95 may be substituted in place of the monochrome producing unit 66 and its connections, to enabling a choice as between the intermediate quality of translation and the superior quality of translation.

I have herein used the term "emit" or "emission" or like terms in the broad meaning of "putting out," whether by radio or wire or closed circuit operation, since in many cases it may be found desirable to transport the signals referred to by and of such terms, or some of such signals, by wire transference instead of by radio through the ether. Accordingly, when, in the claims and specification I use such terms as "emit" or "emission" it will be understood that I use them in their broad sense, except as I may use them in the claims in a manner and/or combination requiring the more limited definition of radio or the like transmission.

It should be noted that when the reversal of horizontal scans according to the principles disclosed in FIGURE 4 hereof, and description of the operations thereof, approximates fifty percent of the scans of a field, the interpretation produced on the raster will be substantially unintelligible; but for less percentages the raster will be of a degraded quality, but nevertheless intelligible.

It is also noted that the improvements herein disclosed are such that they may be incorporated and used in conventional television broadcasting systems, which broadcast to large numbers of receivers within receiving range of the sending station; and that it is possible to incorporate said improvements into presently conventional broadcasting systems by incorporating into the sending stations only such special equipment as may be required to meet the operational conditions explained in connection with each of the embodiments herein illustrated, as well as other embodiments incorporating the operational principles disclosed herein. Having thus made provision in a broadcasting system for emission of the program signals, both video and audio (if needed), which signals are special to the intended emission of such video and audio components, any conventional receiver may receive and intelligibly translate such signals, to produce an intelligible translation, but of aesthetic quality degraded according to the embodiment which is selected and used in the sending station. Having thus specially equipped such sending station, the "special" programs emitted therefrom may be received by the pre-pay or subscription receivers equipped with such supplemental translating components as may be needed, according to the manner of emission of the "special" program signals from the sending station in question.

It is also noted that any individual pre-pay or subscription receiver embodying the necessary supplemental components to receive and translate the "special" programs emitted according to a selected operational specification, such as herein disclosed, may receive and properly translate such "special" program signals from any one of a plurality of selected sending stations each of which is equipped to emit the "special" program signals according to the selected operational conditions (e.g., a selected embodiment such as either FIGURE 1, or 2, or 3, or 4, or 5, or other), and which sending stations are equipped and operated on pre-determined channel frequencies and bandwidths individual to such sending stations. In such a case the control signal frequencies of such plurality of sending stations would be individual to the sending stations located within a prescribed reception area, according to present conventional practice or practice to become conventional. Accordingly, the connection 65 from the tuning or channel selecting button 54 of each pre-pay or subscription receiver, would be so constituted and the oscillator unit 38 of such unit would be so constituted, that upon tuning such receiver to any selected channel or sending station by manipulation of such button 54, the resonant frequency of the unit 38 would be made to match the control signal frequency of the sending station so tuned; thus making such receiver operational to receive and translate the "special" signals emitted by the sending station in question.

Each of the embodiments herein illustrated and described is constituted to enable the operator of the receiver to choose between monochrome translation (without pre-pay or subscription operation) and full color translation (with pre-pay or subscription operation). Additionally, each such embodiment discloses the provision of another aesthetic quality degrading operation which is shown as emitted in such manner as to cause all conventional receivers within receiving range of the sending station, and tuned to the same station as that of the pre-pay or subscription receiver in question, to receive the program in degraded but intelligible aesthetic quality. Such other degrading operations herein disclosed include "upside-down vs. right-side-up," FIGURE 1; "wrong color sequence vs. correct-color sequence," FIGURE 2; "negative translation" vs. "positive translation," FIGURE 3; "reversed direction of horizontal scan" vs. "corrected direction of horizontal scan," FIGURE 4; and "interfering audio signal" vs. "pure audio reception," FIGURE 5. Other sets of signals constituted to produce the herein disclosed functions are also contemplated as being within the scope of my present invention, as defined in the claims. Additionally, I also contemplate as being within the scope of my present invention, as defined in the claims, various other combinations of choice of aesthetic quality as between an inferior and a superior quality, within the choice of the operator of the receiver, the superior quality translation being a pre-pay or subscription operation, together with another quality degrading operation which will affect all conventional receivers within receiving range, and which are tuned to the program in question; it being understood that such program, when including both video components and audio components, is contemplated as being within the scope of my present invention, as defined in the claims.

Various operations have been described herein, whereby selection may be made as between a degraded aesthetic quality of translation and a superior quality thereof.

When it is desired that the selection as between two different grades or qualities of translation be produced in the form of monochrome for the degraded quality, and full color for the superior quality, supplemental means must then be provided and other operations must be produced, to enable production of the program translation in the conventional receiver, in a degraded quality.

Accordingly, each of the embodiments herein illustrated is provided with supplemental means in the sending station to emit the program signals under conditions such that reception of such signals by a conventional receiver will produce a translation of degraded quality (and would also produce such degraded quality translation in the pre-pay or subscriber receiver in absence of corrective means in the pre-pay receiver); and such pre-pay or subscriber receiver is then also provided with its own corrective means, automatically operable by the control signal, to effect the correction which is not and cannot be made in the conventional receiver. Such corrective means comprises the unit $\mathbf{66}^{a}$ and related elements of FIGURE 1; the unit $\mathbf{70}^{b}$ and related elements of FIGURE 2; the unit $\mathbf{79}^{c}$ and related elements of FIGURE 3; the unit $\mathbf{83}^{d}$ and related elements of FIGURE 4; and the unit $\mathbf{91}^{e}$ of FIGURE 5, including its related elements. Even so, each of the structures shown in the several figures must and will produce the picture on the viewing screen of the pre-pay or subscription receiver, in monochrome until pre-pay or remote control operation has been produced, when the translation will shift automatically to full color. It is noted that the embodiment shown in FIGURE 5 comprises a special form of translation since the degrading quality of the reception is produced by degrading the quality of the audio reception and translation, without correction for such degrading operation, in the conventional receiver or elsewhere, for such conventional receiver.

Examination of each of FIGURES 1, 2, 3, 4 and 5, shows the legend "Conventional Receiver" (with the further words "Station Selector") just above the viewing screen of such figure. Such conventional receivers are identified as 61[a], 61[b], 61[c], 61[d] and 61[e], respectively. These "Conventional Receivers" need not be provided with any supplemental elements of circuitry or otherwise, nor is it necessary to change or modify the conventional circuitry of such receivers, to cause them to receive and translate the emitted degraded video or audio signals for production of the program translation as a fully intelligible translation but of degraded aesthetic quality. This is true since the program signals are produced in such form that each such "Conventional Receiver" may translate such signals, and the "degrading" of such signals does not prevent such translation, for production of a fully intelligible translation, but of the degraded quality. On the contrary, the pay or subscription receivers are provided with correction means to neutralize or counterbalance such degrading modification of the emitted video signals, to thus cause such emitted and received video (or audio) signal modification to be erased, leaving the non-modified (now-corrected) signals and translation thereof, as a non-degraded quality translation. Such erasing or neutralizing or correcting operation may be produced automatically in or for each pay or subscription receiver, as by use of the control signal, so that the program rendition produced by such receiver is non-degraded, regardless of whether pay or subscription operation is made for the rendition of the program in selected aesthetic quality.

Where in the claims I use the term "Conventional Receiver" or a like term, as defining a non-pay or non-subscription receiver, I refer to receivers of conventional structure (either Monochrome or Color) which are not provided with correction or supplemental elements or units, or modifications of circuitry constituted to cause such received signals to be translated without the degrading signal components, whether such degrading components be video signal components or audio signal components.

The structure shown in each of FIGURES 1 to 5, inclusive, also discloses pay or subscription receivers and supplementary means whereby programs received in color signals will be automatically translated to produce Monochrome rasters, together with means to cause such Color signal received programs to be translated as Color raster programs, when pay or subscription operation is produced. Accordingly, such disclosed structures are capable of producing the Color signals received program in either of three qualities, as follows; either as a degraded program rendition (when the program is broadcast without the control signal, but with inclusion of the degrading component in the transmitted signals), pay or subscription operations not having been made, being a Monochrome raster with inclusion of the degrading component; or when the control signal is delivered, either as a component of the video or the audio signals transmission or otherwise, the raster being a Monochrome translation and without inclusion of the degrading component, pay or subscription operation not having been made; or when the control signal is delivered, either as a component of the video or audio signals transmission or otherwise, the raster being a Color translation and without inclusion of the degrading component, pay or subscription operation having been made.

It is noted that even when the degrading component is included in the transmitted and received signals, received by the pay receivers, such non-pay or conventional receivers must produce their program translations under the degraded quality since such non-pay or conventional receivers are not provided with means to nullify or neutralize the degrading component. Accordingly, all conventional receivers within receiving range of the sending station may receive the program as a fully intelligible program translation, but degraded according to the quality and character of the degrading component.

I claim:

1. In a television system, a sending station including means constituted to produce video signals corresponding to scanning an object, and including means to emit said signals; said sending station including signal inverting means, and including means constituted to include or to exclude said inverting means in the signal producing and emitting means, selectively, to cause the emitted signals to correspond to exclusion of said inverting means in the signal producing and emitting means, constituting a first defined quality of the emitted signals, or to cause the emitted signals to correspond to inclusion of said inverting means in the signal producing and emitting means, constituting a second defined quality of the emitted signals, selectively; means in connection with said sending station constituted to emit a control signal concurrently with emission of said video signals; a plurality of receivers including pay receivers and non-pay receivers, each constituted to receive and intelligibly translate all of said emitted signals including said inverter excluded production, first quality defined signals and said inverter included production, second quality defined signals, to produce an intelligible raster on the viewing screen of each receiver according to the exclusion or inclusion of said inverter means in the signal production means; together with video signal inverter means in connection with each pay receiver, means constituted to receive and translate the control signal for each pay receiver, together with means operable by the translated control signal, constituted to cause the translation of the received video signals of said second quality to include the signal inverter means concurrently with reception of such video signals by such receiver, to produce on the viewing screen of such pay receiver, a raster corresponding to non-inverted video signals.

2. In a television system, a sending station including means to produce and emit video signals and audio signals corresponding to a program to be received and translated; means to include in the audio signals a sonic frequency interfering signal other than the audio signals which comprise a portion of said program; a plurality of receivers each constituted to receive and translate said video signals to produce an intelligible raster, and each receiver being constituted to receive and translate said audio signals including said sonic frequency interfering signals, and including a speaker and connections between the audio frequency translating means and the speaker; said receivers including pay-receivers and non-pay-receivers; each pay receiver including interfering signal inverter means, interfering signal input connections between the audio frequency translating means and the inverter, and inverted interfering signal connections between the inverter and the speaker; together with means to make effective or ineffective said inverter means selectively; wherein the sending station includes means to produce and emit a control signal, and wherein each pay-receiver includes response means responsive to such control signal; and wherein the means in each pay-receiver which makes effective or ineffective the inverter means, comprises the response means which is responsive to the control signal, including means to make effective the inverter means when the control signal is received and interpreted by such pay-receiver.

3. In a television system, a sending station including means to produce and emit video signals, including means to produce said signals in two different time and color and spatial patterns selectively, one such pattern being a first defined pattern and the other pattern being a second defined pattern; a plurality of receivers each constituted to receive and intelligibly translate the received signals which were emitted according to either the first defined spatial pattern or the second defined spatial pattern; said plurality of receivers including pay-receivers and non-pay-receivers; means in connection with each pay-receiver constituted to cause such pay receiver to translate video signals emitted according to said second defined spatial pattern, to be interpreted in such pay-receiver according to the first defined or the second defined spatial pattern, selectively, including means to condition such signals for production of a raster on its viewing screen according to either a first defined quality or a second defined quality, including means to cause the interpretation to be for production of the raster in said second defined quality concurrently with emission of said second defined pattern; together with means in connection with each pay-receiver and under control of an operator of such receiver, constituted to cause the raster production to be in said first defined quality.

4. A system as defined in claim 3, wherein the first defined time and color and spatial pattern of emission of the video signals, includes means to cause production of the signals according to the first defined spatial pattern, and wherein the second defined time and color and spatial pattern of emission of the video signals, includes means to cause production of the signals according to the second defined spatial pattern; and wherein the first defined quality of raster production is a color raster, and the second defined quality of raster production is a monochrome raster.

5. A system as defined in claim 4, wherein the sending station also includes means to produce and emit a control signal, and wherein each pay-receiver includes means activated by the translated control signal to cause the video signals to be interpreted and translated according to the first defined pattern producing means, concurrently with translation of such control signal by such pay-receiver.

6. A system as defined in claim 5, wherein the pay-receiver also includes means activated by the translated control signal to cause the video signals to be interpreted and translated according to the second defined monochrome quality to produce a monochrome raster.

7. A system as defined in claim 6, wherein the means which is activated by the translated control signal also includes operator controlled selecting means constituted to cause the raster to be produced according to the first defined quality color raster.

8. A system as defined in claim 7, wherein said operator controlled selecting means comprises a coin or token pre-pay unit.

9. A system as defined in claim 7, wherein said operator controlled selecting means comprises a remote control device.

References Cited

UNITED STATES PATENTS

| | | | |
|---|---|---|---|
| 2,405,252 | 8/1946 | Goldsmith | 178—5.1 XR |
| 2,547,598 | 4/1951 | Roschke | 178—5.1 |
| 2,623,941 | 12/1952 | Aram | 178—5.1 |
| 2,857,455 | 10/1958 | Jolliffe | 178—5.2 XR |
| 3,310,624 | 3/1967 | Banning | 178—5.1 |
| 3,336,439 | 8/1967 | Banning | 178—5.6 |

ROBERT L. GRIFFIN, *Primary Examiner.*

RICHARD MURRAY, *Assistant Examiner.*

U.S. Cl. X.R.

178—5.1, 5.6